(12) United States Patent (10) Patent No.: US 12,511,365 B2
Duane et al. (45) Date of Patent: Dec. 30, 2025

(54) SYSTEMS AND METHODS FOR CROSS COUPLING RISK ANALYTICS AND ONE-TIME-PASSCODES

(71) Applicant: Capital One Services, LLC, McLean, VA (US)

(72) Inventors: William Duane, Westford, MA (US); Kevin Osborn, Newton, MA (US)

(73) Assignee: Capital One Services, LLC., McLean, VA (US)

( * ) Notice: Subject to any disclaimer, the term of this patent is extended or adjusted under 35 U.S.C. 154(b) by 0 days.

(21) Appl. No.: 18/227,433

(22) Filed: Jul. 28, 2023

(65) Prior Publication Data

US 2024/0028686 A1 Jan. 25, 2024

Related U.S. Application Data

(63) Continuation of application No. 17/165,527, filed on Feb. 2, 2021, now Pat. No. 11,748,466, which is a (Continued)

(51) Int. Cl.
*G06F 21/34* (2013.01)
*G06Q 20/38* (2012.01)
(Continued)

(52) U.S. Cl.
CPC .......... *G06F 21/34* (2013.01); *G06Q 20/385* (2013.01); *G06Q 20/40* (2013.01); *G06Q 20/401* (2013.01);
(Continued)

(58) Field of Classification Search
None
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
CN 104392221 A 3/2015
(Continued)

OTHER PUBLICATIONS

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Michael W Chao
(74) *Attorney, Agent, or Firm* — KDW FIRM PLLC

(57) ABSTRACT

Example embodiments provide systems and methods for validating an action using a physical token, such as a near-field-communications (NFC)-capable chip. A server may receive a request to perform the action, and may require validation from the holder of the physical token. The holder of the physical token may log into an application using their login credentials, providing a first tier of authentication. The holder may then scan the physical token with a reader on their mobile device, which provides a second tier of authentication. The scan may reveal a value for a counter on the physical token, which may be compared to a counter at the server in order to validate that the physical token has been used as expected. If the server deems it appropriate, a third (or further) tier may be required, such as scanning a photographic identification of the holder.

20 Claims, 12 Drawing Sheets

Related U.S. Application Data continuation of application No. 16/675,172, filed on Nov. 5, 2019, now Pat. No. 10,949,520, which is a continuation-in-part of application No. 16/205,119, filed on Nov. 29, 2018, now Pat. No. 10,581,611.

(60) Provisional application No. 62/740,352, filed on Oct. 2, 2018.

(51) Int. Cl.
*G06Q 20/40* (2012.01)
*H04L 9/32* (2006.01)
*H04L 9/40* (2022.01)
*H04W 12/06* (2021.01)

(52) U.S. Cl.
CPC ....... *G06Q 20/4016* (2013.01); *H04L 9/3234* (2013.01); *H04L 9/3271* (2013.01); *H04L 63/0853* (2013.01); *H04W 12/06* (2013.01)

(56) References Cited

U.S. PATENT DOCUMENTS

| | | | |
|---|---|---|---|
| 6,016,963 A * | 1/2000 | Ezawa | G06Q 20/4016 |
| | | | 235/375 |
| 6,199,114 B1 | 3/2001 | White | |
| 6,324,271 B1 | 11/2001 | Sawyer | |
| 6,367,011 B1 | 4/2002 | Lee | |
| 6,572,015 B1 | 6/2003 | Norton | |
| 7,252,242 B2 | 8/2007 | Ho | |
| 7,270,276 B2 | 9/2007 | Vayssiere | |
| 7,287,692 B1 | 10/2007 | Patel | |
| 7,374,099 B2 | 5/2008 | de Jong | |
| 7,527,208 B2 | 5/2009 | Hammad | |
| 7,568,631 B2 | 8/2009 | Gibbs | |
| 7,584,153 B2 | 9/2009 | Brown | |
| 7,628,322 B2 | 12/2009 | Holtmanns | |
| 7,650,314 B1 * | 1/2010 | Saunders | G06Q 20/10 |
| | | | 705/64 |
| 7,793,851 B2 | 9/2010 | Mullen | |
| 7,801,799 B1 | 9/2010 | Brake, Jr. | |
| 7,908,216 B1 | 3/2011 | Davis | |
| 7,922,082 B2 | 4/2011 | Muscato | |
| 8,010,405 B1 | 8/2011 | Bortolin | |
| 8,074,877 B2 | 12/2011 | Mullen | |
| 8,082,450 B2 | 12/2011 | Frey | |
| 8,108,687 B2 | 1/2012 | Ellis | |
| 8,186,602 B2 | 5/2012 | Itay | |
| 8,196,131 B1 | 6/2012 | Von Behren | |
| 8,249,654 B1 | 8/2012 | Zhu | |
| 8,276,814 B1 | 10/2012 | Davis | |
| 8,332,272 B2 | 12/2012 | Fisher | |
| 8,346,670 B2 | 1/2013 | Hasson | |
| 8,511,547 B2 | 8/2013 | Rans | |
| 8,519,822 B2 | 8/2013 | Riegebauer | |
| 8,750,514 B2 | 6/2014 | Gallo | |
| 8,870,081 B2 | 10/2014 | Olson | |
| 9,038,893 B2 | 5/2015 | Kirkham | |
| 9,124,433 B2 | 9/2015 | Marien | |
| 9,129,199 B2 | 9/2015 | Spodak | |
| 9,183,490 B2 | 11/2015 | Moreton | |
| 9,275,325 B2 | 3/2016 | Newcombe | |
| 9,286,606 B2 | 3/2016 | Diamond | |
| 9,306,753 B1 | 4/2016 | Vandervort | |
| 9,501,776 B2 | 11/2016 | Martin | |
| 9,508,068 B2 * | 11/2016 | Mastrangelo | G06Q 20/40 |
| 9,710,744 B2 | 7/2017 | Wurmfeld | |
| 9,949,065 B1 | 4/2018 | Zarakas | |
| 9,965,632 B2 | 5/2018 | Zarakas | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld | |
| 9,990,795 B2 | 6/2018 | Wurmfeld | |
| 10,007,873 B2 | 6/2018 | Heo | |
| 10,013,693 B2 | 7/2018 | Wyatt | |
| 10,121,130 B2 | 11/2018 | Pinski | |
| 10,210,505 B2 | 2/2019 | Zarakas | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,366,378 B1 * | 7/2019 | Han | G06Q 20/204 |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,902,429 B2 * | 1/2021 | Ebel | G06Q 20/4016 |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B2 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 11,928,729 B2 * | 3/2024 | Dogin | G06Q 20/10 |
| 12,058,263 B2 * | 8/2024 | Wang | H04L 9/3213 |
| 12,086,787 B2 * | 9/2024 | Hammad | G06Q 20/4018 |
| 2003/0220876 A1 | 11/2003 | Burger | |
| 2005/0156026 A1 | 7/2005 | Ghosh | |
| 2005/0228997 A1 | 10/2005 | Bicker | |
| 2005/0269402 A1 | 12/2005 | Spitzer | |
| 2007/0228144 A1 * | 10/2007 | Knackstedt | G06Q 20/00 |
| | | | 235/376 |
| 2007/0276765 A1 | 11/2007 | Hazel | |
| 2008/0040276 A1 * | 2/2008 | Hammad | G06Q 20/385 |
| | | | 705/44 |
| 2008/0065553 A1 * | 3/2008 | Faith | G06Q 20/3829 |
| | | | 705/64 |
| 2008/0082452 A1 | 4/2008 | Wankmueller | |
| 2008/0099552 A1 | 5/2008 | Grillion | |
| 2009/0055893 A1 * | 2/2009 | Manessis | G06Q 20/4016 |
| | | | 726/2 |
| 2009/0143104 A1 | 6/2009 | Loh | |
| 2009/0235339 A1 | 9/2009 | Mennes | |
| 2009/0282264 A1 | 11/2009 | Amiel | |
| 2010/0235326 A1 * | 9/2010 | Fashchik | G06F 11/2071 |
| | | | 707/E17.005 |
| 2011/0112920 A1 * | 5/2011 | Mestre | G06Q 20/40 |
| | | | 705/17 |

(56) References Cited

U.S. PATENT DOCUMENTS

| | | | |
|---|---|---|---|
| 2011/0113245 A1 | 5/2011 | Varadarajan | |
| 2011/0119155 A1 | 5/2011 | Hammad et al. | |
| 2011/0153862 A1* | 6/2011 | Roosta | H04L 65/102 |
| | | | 709/234 |
| 2011/0155801 A1 | 6/2011 | Rowberry | |
| 2012/0143703 A1 | 6/2012 | Wall | |
| 2013/0030997 A1 | 1/2013 | Spodak | |
| 2013/0146657 A1 | 6/2013 | Graef | |
| 2013/0211937 A1 | 8/2013 | Elbirt | |
| 2013/0311363 A1 | 11/2013 | Ramaci | |
| 2014/0074637 A1 | 3/2014 | Hammad | |
| 2014/0074655 A1 | 3/2014 | Lim | |
| 2014/0074724 A1* | 3/2014 | Gordon | G06Q 20/023 |
| | | | 705/44 |
| 2014/0081785 A1 | 3/2014 | Valadas Preto | |
| 2014/0208386 A1* | 7/2014 | Sama | H04L 63/14 |
| | | | 726/4 |
| 2014/0365377 A1 | 12/2014 | Salama | |
| 2015/0032635 A1 | 1/2015 | Guise | |
| 2015/0073983 A1 | 3/2015 | Bartenstein | |
| 2015/0113271 A1 | 4/2015 | Jooste | |
| 2015/0134513 A1 | 5/2015 | Olson | |
| 2015/0134540 A1* | 5/2015 | Law | G06Q 20/409 |
| | | | 705/72 |
| 2015/0199673 A1 | 7/2015 | Savolainen | |
| 2015/0199863 A1 | 7/2015 | Scoggins | |
| 2015/0206136 A1 | 7/2015 | Maddocks et al. | |
| 2015/0254637 A1 | 9/2015 | Yang | |
| 2015/0317295 A1 | 11/2015 | Sherry | |
| 2015/0318998 A1* | 11/2015 | Erlikhman | H04L 63/0853 |
| | | | 713/171 |
| 2016/0078430 A1 | 3/2016 | Douglas | |
| 2016/0087957 A1* | 3/2016 | Shah | H04L 63/205 |
| | | | 726/1 |
| 2016/0189143 A1 | 6/2016 | Koeppel | |
| 2016/0253651 A1 | 9/2016 | Park | |
| 2016/0277383 A1 | 9/2016 | Guyomarc'h | |
| 2016/0292676 A1* | 10/2016 | French | G06Q 20/401 |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0221047 A1 | 8/2017 | Veerasangappa Kadi et al. | |
| 2017/0330173 A1 | 11/2017 | Woo | |
| 2018/0039987 A1 | 2/2018 | Molino | |
| 2018/0048472 A1 | 2/2018 | Pirrwitz | |
| 2018/0268132 A1 | 9/2018 | Buer | |
| 2018/0300716 A1 | 10/2018 | Carlson | |
| 2019/0132134 A1* | 5/2019 | Noe | H04W 12/08 |
| 2019/0172055 A1 | 6/2019 | Hale | |
| 2019/0303945 A1 | 10/2019 | Mitra | |
| 2020/0106756 A1* | 4/2020 | Osborn | H04L 9/3271 |
| 2020/0167766 A1* | 5/2020 | Maddocks | G06Q 20/08 |
| 2021/0004806 A1 | 1/2021 | Noe | |
| 2021/0272098 A1 | 9/2021 | Delsuc | |
| 2021/0304189 A1 | 9/2021 | Gupta | |
| 2021/0352049 A1* | 11/2021 | Aabye | H04L 63/102 |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |
| 2024/0104548 A1* | 3/2024 | Law | G06Q 20/4012 |

FOREIGN PATENT DOCUMENTS

| | | | |
|---|---|---|---|
| GB | 2516861 | A | 2/2015 |
| GB | 2551907 | A | 1/2018 |
| JP | H11305867 | A | 11/1999 |
| JP | 2007529935 | A | 10/2007 |
| JP | 2010244191 | A | 10/2010 |
| JP | 2017041001 | A | 2/2017 |
| KR | 20120082568 | A | 7/2012 |
| KR | 20150055197 | A | 5/2015 |
| KR | 20150140132 | A | 12/2015 |
| KR | 20170133307 | A | 12/2017 |
| KR | 20180024596 | A | 3/2018 |
| KR | 20190016888 | A | 2/2019 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps:///web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

(56) References Cited

OTHER PUBLICATIONS

Smart Card Alliance, "Co-Branded Multi-Application Contactless Cards for Transit and Financial Payment," A Smart Card Alliance Transportation Council White Paper (40 pages), Mar. 2008.
Ullmann et al., "On-Card" User Authentication for Contactless Smart Cards based on Gesture Recognition, paper presentation LNI proceedings, (2012) 12 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

INTERFACE
200

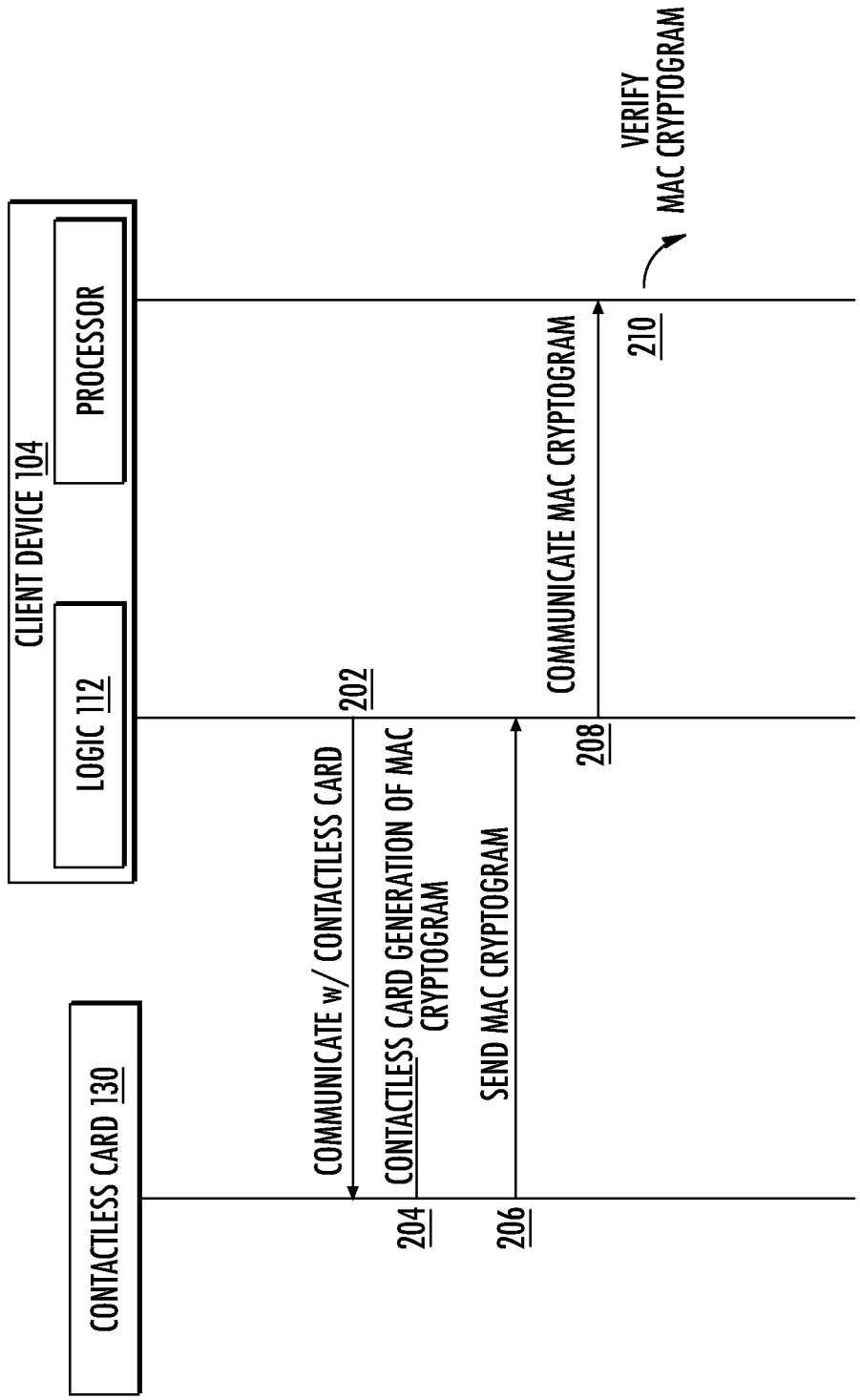

SYSTEMS AND METHODS FOR CROSS COUPLING RISK ANALYTICS AND ONE-TIME-PASSCODES

CROSS-REFERENCE TO RELATED APPLICATIONS

This application is a continuation of U.S. patent application Ser. No. 17/165,527, filed Feb. 2, 2021, which is a continuation of U.S. patent application Ser. No. 16/675,172, filed on Nov. 5, 2019, which is a continuation-in-part of U.S. patent application Ser. No. 16/205,119, filed on Nov. 29, 2018, which claims priority from U.S. Provisional Application No. 62/740,352, filed on Oct. 2, 2018, the disclosures of which are incorporated herein by reference in their entirety.

FIELD OF THE INVENTION

The present disclosure relates to cryptography, and more particularly, to system and methods for cryptographic authentication of contactless cards.

BACKGROUND

Data security and transaction integrity are of critical importance to businesses and consumers. This need continues to grow as electronic transactions constitute an increasingly large share of commercial activity.

When a questionable or suspicious transaction is processed, verification of the transaction may be required. Conventionally, this may involve sending a message to a user via email or short message service (SMS), requesting that the user confirm their intent to engage in the transaction.

In addition to being cumbersome, these services are vulnerable to attack and may therefore not provide a sufficient level of security. Moreover, if a user keeps their card with their mobile device (e.g., storing both in a purse, or keeping the card in a wallet that is often co-located with the mobile device), a fraudulent actor may be in possession of the device that is used to authenticate the transaction.

BRIEF DESCRIPTION OF THE DRAWINGS

FIG. 2C depicts an example of data exchange between a contactless card and a client device.

DETAILED DESCRIPTION OF EXAMPLE EMBODIMENTS

Figure 1A:
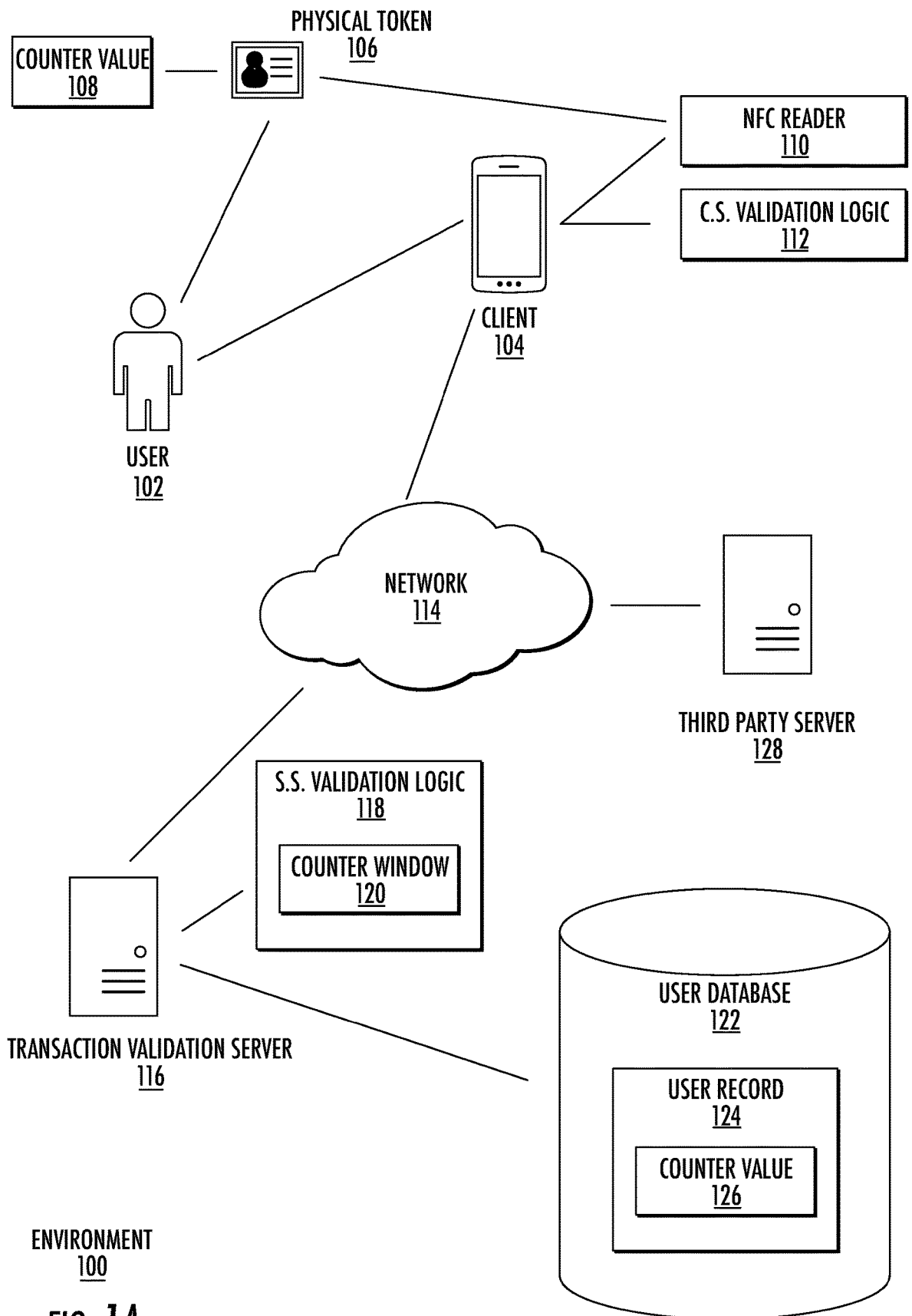
FIG. 1A depicts an environment suitable for use with exemplary embodiments.

Exemplary embodiments provide techniques for increasing the security of contactless cards while allowing transactions to be carried out in a more efficient and user-friendly way. These embodiments may be used to ensure that the card is physically present with the card owner (which may prevent transactions when the card has been stolen for a fraudulent in-person transaction) and ensure that the card owner authorizes the transaction (which can be used to verify either an in-person or a remote transaction). Moreover, the process of validating the transaction involves interaction with a physical token on the card. Because of this interaction, the card must be used to authorize both in-person and remote transactions, and unauthorized transactions can be quickly identified and denied.

More specifically, when a user wishes to access their account (e.g., on a mobile device), a system requests authorization of the card owner. The card owner is asked to sign into an application executing on their mobile device, and to scan a physical token associated with their card (e.g., a contactless chip capable of wireless communication with the mobile device, such as NFC, Bluetooth, WiFi, etc., or wired communication, such as by a USB connection). These steps establish that the card is in the physical possession of the card owner; in theory, only the card owner should be able to sign into the mobile application, and if the card is scanned by the local NFC reader, then the card's presence in the possession of the card owner may be confirmed.

Each time the card is used, a counter value stored on the physical token may be incremented and transmitted to a remote server for validation. As part of the scanning process to validate the transaction, the counter present on the card may be checked against the remote copy stored on the server. If the counter value read from the card is not the value expected by the server, this may indicate that the card or the owner's account has been used for unauthorized transactions (since the card's counter value was not a value expected by the server, either indicating that the card was used and the transaction was not recorded, or that an attacker is attempting to replay a captured previous session in an attempt to replay a transaction).

In many cases, the counter value on the card may not perfectly match the counter value stored on the server. For instance, in the case of a partial read (which might occur if the user keeps their card near their phone without intending to actually read the value on the physical token), the remote server might not get updated with an increased counter value, although the counter on the token may be locally updated. The degree to which the counter values must agree may depend on the risk level of the transaction and/or the current risk profile of the environment (e.g., whether a banking institution is currently under attack). Thus, for low-risk transactions, the counter value on the card must match the counter value on the server within a certain predetermined range (which allows the system to account for accidental reads of the card). For high risk transactions, the counter values must match exactly, or within a narrower predetermined range. The ranges may be determined dynamically based on what is known of the user's regular interactions with the card (e.g., if the user has historically been susceptible to accidental reads of the token, then the range may be set higher as compared to a user that whose card has not generally been susceptible to such reads). If the system determines that a discrepancy exists, a first course of action may be to request that the user re-validate their card with the application on their mobile device. In this case, the counter value for this additional authentication should have advanced beyond the value contained in the suspect authentication request. If the system still cannot validate the counter value, or for especially high-risk requests, further validation may be required (e.g., the application may request that the user provide biometric validation, a picture of the user, or a scan of the user's identification; alternatively, the user may be asked to physically present themselves at a location, such as a bank, for in-person validation). These actions allows the validation process to be adapted to the risk profile.

Similarly, the risk profile may be altered based on information gleaned during the validation process. For instance, if the transaction was originally flagged as low-risk, but the counter values read during the process indicate fraudulent activity may have occurred, then the risk associated with the transaction may be elevated. In another example, if the validation of the counter value triggered a re-validation process, the risk level associated with this user and/or transactions may be elevated Furthermore, these two options (adjusting the authentication strength based on the risk profile, and adjusting the risk profile based on the authentication results) can be combined and used in tandem.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

FIG. 1A illustrates a data transmission environment 100 according to an example embodiment. As further discussed below, system 100 may include contactless card including a physical token 106, a client device 104, a network 114, and a number of servers 116, 128. Although FIG. 1A illustrates a particular configuration of components, one of ordinary skill in the art will understand that other configurations including more or fewer components, or components in another configuration, may be used.

The environment 100 may include one or more contactless cards, which are further explained below with reference to FIG. 1B. In some examples, a contactless card may be in wireless communication, for example NFC communication, with the client device 104. The contactless card may include a physical token 106, such as a contactless chip (see FIG. 1C). The physical token 106 may maintain a copy of the above-noted counter value 108, which may be incremented each time the physical token is read by a reader (such as the NFC reader 110).

The environment 100 may include a client device 104, which may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device.

The client device 104 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

The client device 104 and/or the contactless card including the physical token 106 may be associated with a user 102, which may be the owner of the contactless card. The user 102 may define credentials for accessing a mobile application on the client device 104, which may be an application associated with a service provider of the contactless card.

The client device 104 may include a near-field communications reader 110 suitable for communicating with the physical token 106; for example, the NFC reader 100 may be used to read the counter value 108 from the physical token 106.

Figure 5:
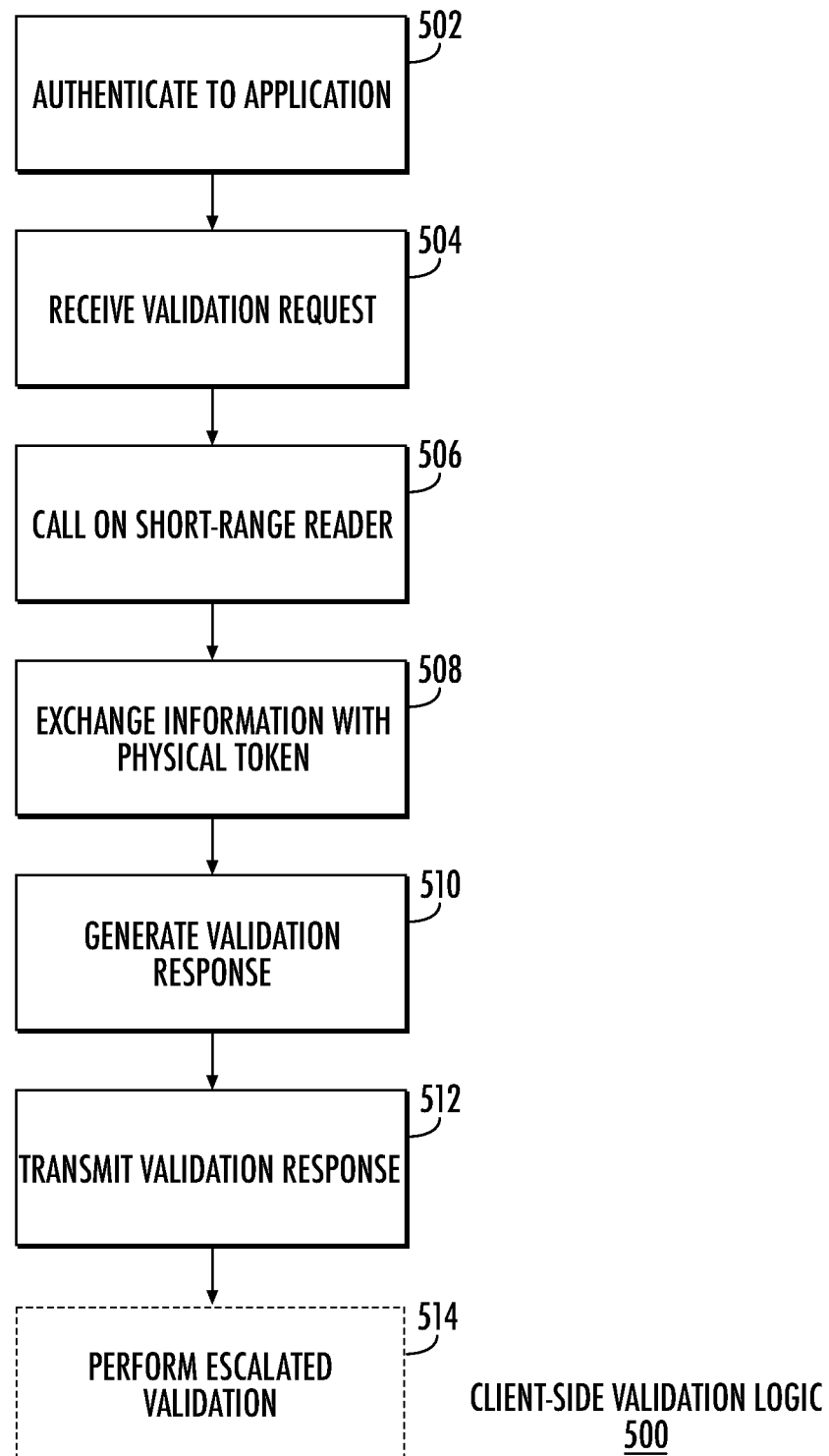
FIG. 5 is a flowchart depicting exemplary client-side transaction validation logic.

In various examples according to the present disclosure, the client device 104 of the environment 100 may execute one or more applications, such as software applications. The software applications may enable network communications with one or more components of the environment 100 and may transmit and/or receive data. Among other computer-executable logic, the client device 104 may include client-side validation logic 112 (such as the logic depicted in more detail in connection with FIG. 5).

The client device 104 may be in communication with one or more servers 116, 128 via one or more networks 114, and may operate as a respective front-end to back-end pair with a transaction validation server 116. The client device 104 may transmit, for example from a mobile device application executing on client device 104, one or more requests to the server 116. The one or more requests may be associated with retrieving data from the server 116. The server 116 may receive the one or more requests from client device 104. Based on the one or more requests from the client device 104, the server 116 may be configured to retrieve the requested data from one or more databases (not shown). Based on receipt of the requested data from the one or more databases, the server 116 may be configured to transmit the received data to the client device 104, the received data being responsive to one or more requests.

The environment 100 may include one or more servers 116, 128. In some examples, the servers 116, 128 may include one or more processors, which are coupled to memory. The servers 116, 128 may be configured as a central system, server or platform to control and call various data at different times to execute a plurality of workflow actions. The servers 116, 128 may be configured to connect to the one or more databases. The client device 104 may be connected to at least one server 116, 128.

In one embodiment, a third-party server 128 may request that a transaction be validated. For instance, the third-party server 128 may be a server associated with a vendor selling a product or service, for which a purchase request is submitted in the name of the user 102. The third-party server 128 may request that the purchase be validated with the service provider.

To that end, the third-party server 128 may communicate, via the network 114, with a transaction validation server 116 affiliated with the service provider. To validate the transaction, the server 116 may execute server-side validation logic 118 (such as the logic depicted in FIG. 6). The logic 118 may maintain a counter window 120 defining a range of acceptable counter values (which, as noted above, account for accidental reads and other unintentional incrementing of the counter value 108). The counter window 120 may include several different ranges associated with different risk levels, such as a relatively wide range for low-risk transactions, and a relatively narrow range (which may require an exact match) for high-risk transactions.

A counter value 126 may be stored in the user database 122 and may be indexed to a record 124 associated with the physical token 106. The logic 118 may apply the counter window 120 when evaluating the counter value 126 stored in the user database 122. For example, upon receiving a new counter value 108, the logic 118 may compare the new counter value 108 to the stored counter value 126, to see if the new value 108 exceeds the stored value 126. If so, the logic 118 may determine whether the new value 108 exceeds the stored value 126 by more than the maximum window value (e.g., the sum of the stored value 126 and the window 120). If the new value is less than the combination of the stored value 126 and the window 120, then the new value 108 may be determined to be acceptable. If not, the new value 108 may be rejected and further action may be taken (as described herein). The user database 122 need not necessarily be a database, but may be any data structure suitable for storing a counter value 126 associated with the physical token 106 of the user 102.

Figure 1B:
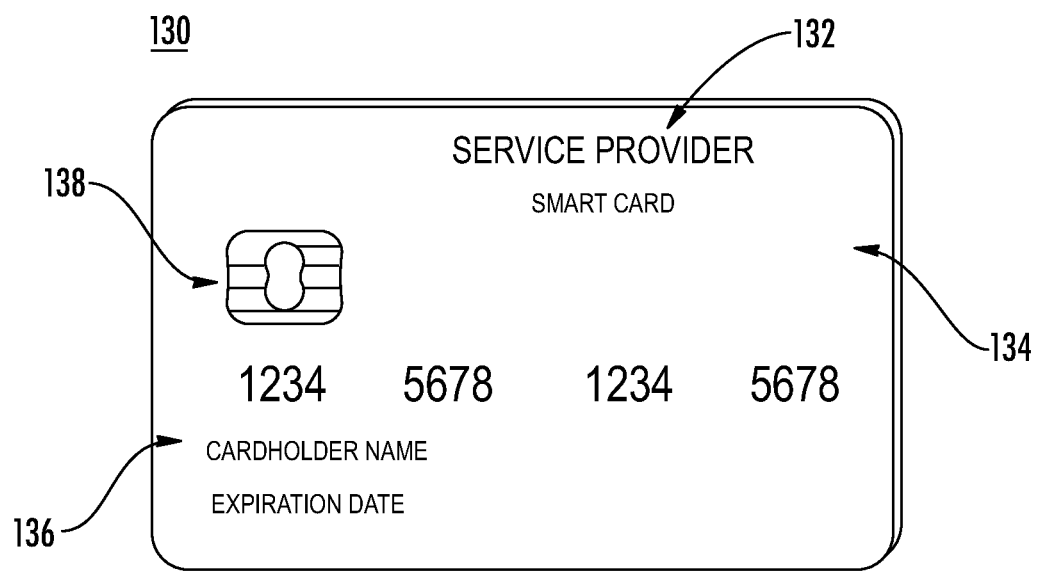
FIG. 1B depicts an example of a contactless card having a physical token.

FIG. 1B illustrates one or more contactless cards 130, which may comprise a payment card, such as a credit card, debit card, or gift card, issued by a service provider 132 displayed on the front or back of the card 130. In some examples, the contactless card 130 is not related to a payment card, and may comprise, without limitation, an identification card. In some examples, the payment card may comprise a dual interface contactless payment card. The contactless card 130 may comprise a substrate 134, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 130 may have physical characteristics compliant with the ID-1 format of the ISO/IEC 7810 standard, and the contactless card may otherwise be compliant with the ISO/IEC 14443 standard. However, it is understood that the contactless card 130 according to the present disclosure may have different characteristics, and the present disclosure does not require a contactless card to be implemented in a payment card.

The contactless card 130 may also include identification information 136 displayed on the front and/or back of the card, and a contact pad 138 representing a physical token. The contact pad 138 may be configured to establish contact with another communication device, such as a user device, smart phone, laptop, desktop, or tablet computer. The contactless card 130 may also include processing circuitry, antenna and other components not shown in FIG. 1C. These components may be located behind the contact pad 138 or elsewhere on the substrate 134. The contactless card 130 may also include a magnetic strip or tape, which may be located on the back of the card (not shown in FIG. 1B).

Figure 1C:
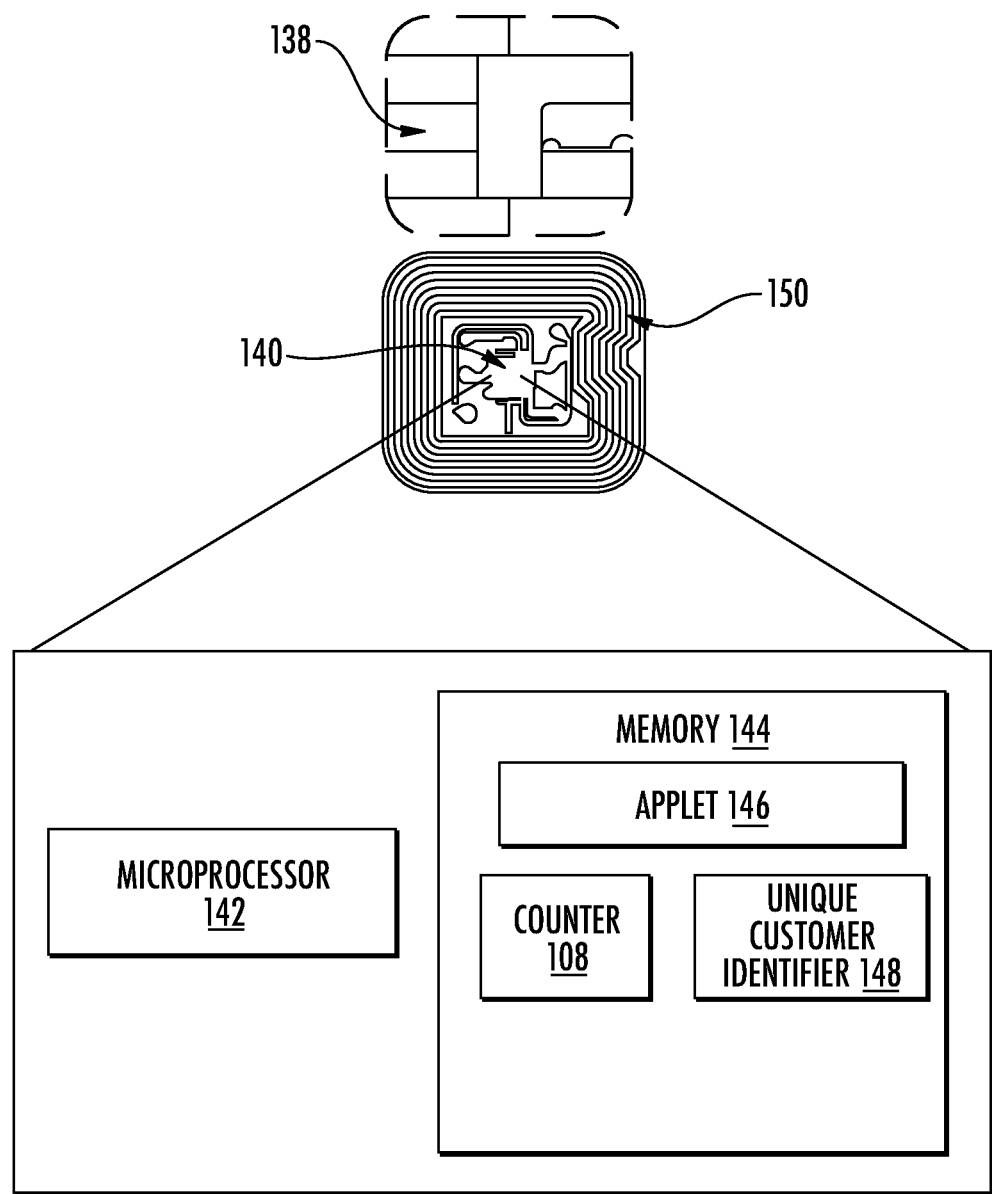
FIG. 1C depicts the structure of an exemplary physical token.

As illustrated in FIG. 1C, the contact pad 138 of FIG. 1B may include processing circuitry 140 for storing and processing information, including a microprocessor 142 and a memory 144. It is understood that the processing circuitry 140 may contain additional components, including processors, memories, error and parity/CRC checkers, data encoders, anticollision algorithms, controllers, command decoders, security primitives and tamperproofing hardware, as necessary to perform the functions described herein.

The memory 144 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 144 may be configured to store one or more applets 146, one or more counters 108, and a customer identifier 148. The one or more applets 146 may comprise one or more software applications configured to execute on one or more contactless cards, such as Java Card applet. However, it is understood that applets 146 are not limited to Java Card applets, and instead may be any software application operable on contactless cards or other devices having limited memory. The one or more counters 108 may comprise a numeric counter sufficient to store an integer. The customer identifier 148 may comprise a unique alphanumeric identifier assigned to a user of the contactless card 130, and the identifier may distinguish the user of the contactless card from other contactless card users. In some examples, the customer identifier 148 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 138 or entirely separate from it, or as further elements in addition to processor 142 and memory 144 elements located within the contact pad 138.

In some examples, the contactless card 130 may comprise one or more antennas 150. The one or more antennas 150 may be placed within the contactless card 130 and around the processing circuitry 140 of the contact pad 138. For example, the one or more antennas 150 may be integral with the processing circuitry 140 and the one or more antennas 150 may be used with an external booster coil. As another example, the one or more antennas 150 may be external to the contact pad 138 and the processing circuitry 142.

In an embodiment, the coil of contactless card 130 may act as the secondary of an air core transformer. The terminal may communicate with the contactless card 130 by cutting power or amplitude modulation. The contactless card 130 may infer the data transmitted from the terminal using the gaps in the contactless card's power connection, which may be functionally maintained through one or more capacitors. The contactless card 130 may communicate back by switching a load on the contactless card's coil or load modulation. Load modulation may be detected in the terminal's coil through interference.

As explained above, the contactless cards 130 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 2A:
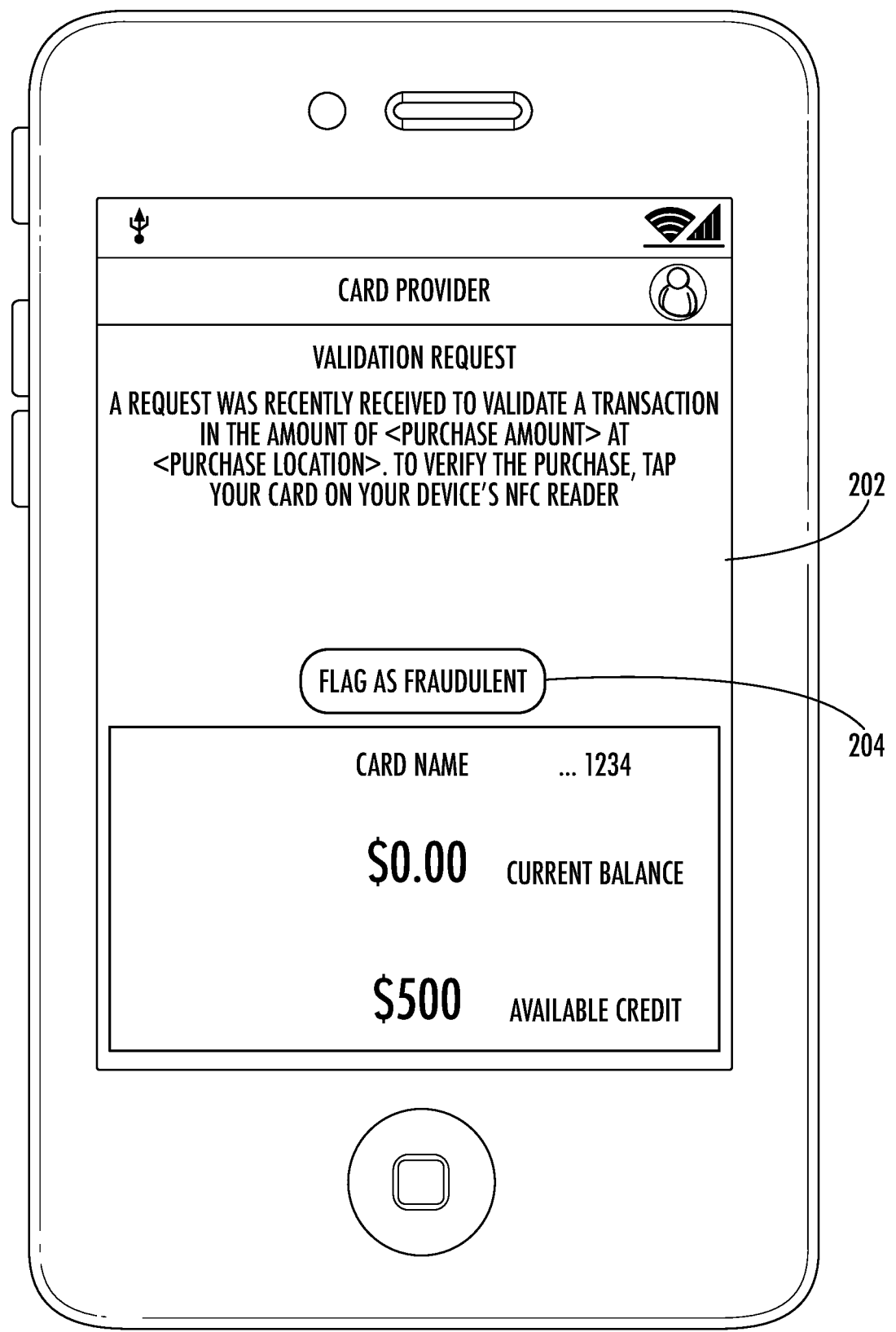
FIG. 2A depicts an exemplary interface for a mobile application associated with an owner of a contactless card.
Figure 2B:
FIG. 2B depicts an exemplary interface when the physical token is read by a reader on the owner's mobile device.

As noted above, exemplary transactions may validate a transaction requested of an account associated with the contactless card via the logic 112 executing on the client device 104. FIGS. 2A-2B depict exemplary interfaces that may be presented on the client device 104 in response to the logic.

Prior to displaying the interfaces, the user of the client 104 may be notified that a transaction requires validation. For instance, the user may receive an SMS message from the service provider, may receive a notification through the service provider's application, may receive a call or an email, etc.

Upon receiving the notification, the user may log into the service provider's application. The user may, for instance, supply a username and password, which may validate the user's identity. In other embodiments, the user may be validated in other ways, such as through biometric data. In some embodiments, login may utilize two-factor authentication (2FA).

When the user logs into the application, they may be presented with an interface, such as the interface 200 depicted in FIG. 2A. In the interface, a message 202 may be displayed indicating that a questionable transaction has been received and requires validation. The message 202 may include details of the transaction, such as the value of the transaction, the name of the vendor attempting to validate the transaction, etc.

The interface 200 may include an interactable element 204 allowing the user to flag the transaction as fraudulent, if the user did not authorize the transaction. Upon selecting the interactable element 204, the application may transmit a fraud alert message to the transaction validation server indicating that the transaction in question is not approved.

Figure 3:
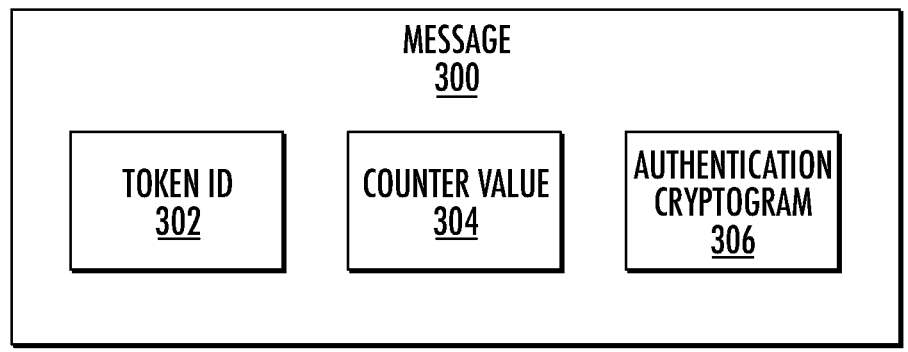
FIG. 3 depicts an exemplary data structure for a message between the contactless card and the client device, or between the client device and a remote server, according to an embodiment.

The message 202 may also include instructions for validating the transaction, if the user did authorize the transaction. In one embodiment, validating the transaction may involve tapping the card 130 to a reader on the back of the client device 104, as shown in FIG. 2B. The reader may read the counter value from the physical token on the card 130, and may generate a message 300 (see FIG. 3) including the counter value 304 and an authentication cryptogram 306. The message 300 may be encrypted.

The counter value 304 may correspond to the counter value most recently read from the card, and the authentication cryptogram 306 may be generated based on cryptographic keys stored on the physical token 138 and may be used to authenticate the card with the transaction validation server and ensure that the message 300 has not been tampered with or corrupted.

The message 300 may also include a token identifier 302, which may identify the card 130 and/or the user associated with the card. For instance, the token identifier 302 may correspond to the unique customer identifier 148 stored in the physical token 138).

Upon receiving the message 300, the transaction validation server may decrypt the message 300, validate the card and the message based on the cryptogram 306, match the message to a user account based on the token identifier 302, and retrieve a user record 124 (see FIG. 1A) from the transaction validation server corresponding to the user account. The transaction validation server may then compare the counter value 304 to the corresponding counter value 126 stored in the user database 122 to verify that the number of reads or transactions on the card matches the expected counter value stored on the server. This may validate that the user is in possession of the card (i.e., that the message 300 is not forged) and that the number of transactions performed by the user matches the service provider's expectation. If the counter values are not in sync, this may indicate that unauthorized transactions have been attempted and may result in the present transaction being declined (or may result in additional validation actions being required).

One of ordinary skill in the art will understand that the message 300 is depicted in a simplified format. In some embodiments, other components may be present in the message, or the depicted components may be combined or modified.

FIG. 2C is a timing diagram illustrating an example sequence for providing authenticated access according to one or more embodiments of the present disclosure. A system may include a contactless card 130 and a client device 104, which may include an application (which may include the logic 112) and a processor.

At 202, the application communicates with the contactless card 130 (e.g., after being brought near the contactless card 130). Communication between the application and the contactless card 130 may involve the contactless card 130 being sufficiently close to a card reader (not shown) of the client device 104 to enable NFC data transfer between the application and the contactless card 130.

At step 204, after communication has been established between client device 104 and contactless card 130, the contactless card 130 generates a message authentication code (MAC) cryptogram. In some examples, this may occur when the contactless card 130 is read by an application (e.g., on the client 104). In particular, this may occur upon a read, such as an NFC read, of a near field data exchange (NDEF) tag, which may be created in accordance with the NFC Data Exchange Format. For example, a reader, such as the application, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 130 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, the application may be configured to transmit a request to contactless card 130, the request comprising an instruction to generate a MAC cryptogram.

At 206, the contactless card 130 sends the MAC cryptogram to the application responsive to the instruction from the client device 104.

At 208, the application communicates the MAC cryptogram with the processor.

At 210, the processor verifies the MAC cryptogram. For example, the MAC cryptogram may be decrypted. In some examples, verifying the MAC cryptogram may be performed by a device other than client device 104, such as a server connected to the client device 104. For example, processor may output the MAC cryptogram for transmission to the server, which may verify the MAC cryptogram.

Figure 4:
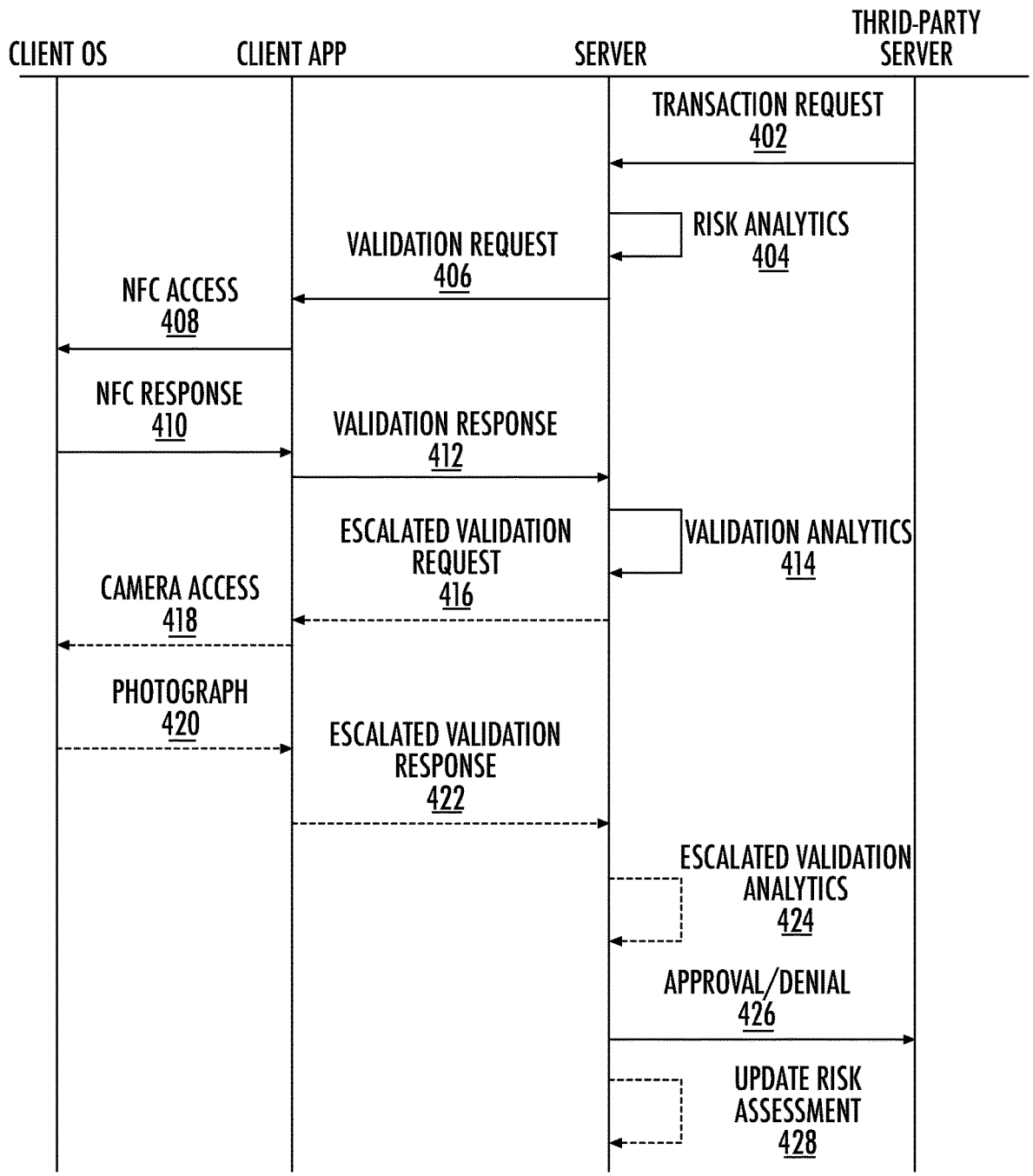
FIG. 4 depicts exemplary data exchanges between the client device and one or more remote servers.

FIG. 4 is a timing diagram depicting exemplary data exchanges between the operating system on the client device, an application on the client device, a transaction validation server, and a third-party server that processes a transaction.

At 402, a third-party server (e.g., a server associated with a vendor for which a credit transaction is requested) may submit a transaction request to a transaction validation server associated with a service provider. The transaction request may be generated in response to scanning a credit card, entering a credit card number into a vendor's payment system, an online transaction with the vendor, etc. The service provider may be identified as part of the process of receiving information relating to the card.

The transaction request may be transmitted to the transaction validation server, which may apply risk analytics 404 to the requested transaction. The risk analytics 404 may identify a risk level associated with the transaction. For instance, the risk analytics 404 may consider the amount of the purchase, the location of the purchase, the user's previous purchase history, the overall risk environment (including such factors as whether an institution such as a bank that issued the contactless card 130 is currently under attack, or whether other institutions have reported a recent increase in fraud), etc. in determining whether the transaction is typical of the user's activity (and therefore low-risk) or is atypical (and is therefore high-risk).

Based on the risk analytics 404, an initial risk score may be assigned to the transaction. A set of risk tiers may be defined, each risk tier associated with a range of risk scores and a required validation action. For instance, for low risk scores, a low risk tier may require no validation action. For moderate risk scores, an intermediate risk tier may require validation by a user by scanning their physical token with their mobile client (in conjunction with logging into an application on the mobile client). For high risk scores, a high risk tier may require the validation actions of the intermediate tier with additional validation actions required. For extremely high risk scores, the transaction may be denied outright.

The initial risk score may be compared to the range of risk scores for the risk tiers and assigned to a particular risk tier. Based on the validation action(s) associated with the risk tier, the associated validation action may be retrieved and performed.

The example of FIG. 4 depicts a situation that occurs when the initial risk score is associated with a moderate risk (i.e., requiring validation by scanning the physical token). Accordingly, at 406, a validation request is generated by the server and sent to the client app. The validation request may cause a notification to be generated informing the user that validation of their recent transaction is required.

In response to the notification, the user may log into the client application using any suitable means (e.g., a username/password combination, biometric authentication, etc.). The user may then be presented with an interface (such as the one depicted in FIG. 2A) and may scan the physical token on their card. Accordingly, at 408, the client application may request access to the physical token reader (e.g., an NFC reader) from the operating system of the client device. At 410, the client OS may receive a response from the reader (e.g., including the counter value) and may forward the response to the client application. Actions 408 and 410 may involve actions similar to those described above in connection with FIG. 2C.

At 412, the client application may generate a validation response (e.g., the message 300) and transmit the response to the transaction validation server.

At 414, the transaction validation server may perform validation analytics. The validation analytics may include validating the cryptogram included in the validation response 412 and comparing the counter value received from the client to the corresponding counter value stored at the server.

As noted above, a difference between the counter value stored on the physical token and the counter value stored on the transaction validation server may indicate the presence of fraudulent transactions. However, the counter value stored on the physical token can become out of sync with the counter value stored on the server for legitimate reasons (e.g., partial reads that are not transmitted to the server, an initial read that occurs on OS startup, etc.). The risk tier associated with the risk analytics may define an acceptable range of variance between the counter value received from the client and the counter value stored on the server. For instance, a relatively low risk tier may provide a relatively broad range of variance, whereas a relatively higher risk tier may provide relatively narrow range (or no range, requiring an exact match).

If the counter value is within the acceptable range, processing may proceed directly to 426 and an approval of the transaction may be transmitted to the third party server.

In addition to the acceptable counter value range, the risk tiers may define various escalation ranges. For example, if the counter value is not within the acceptable range, but is within a secondary range, further validation actions may be required to validate the transaction. Alternatively, the initial risk score may be re-evaluated in light of the mismatch between the counter value from the client and the counter value stored at the server, and the transaction may be elevated to a higher risk tier based on the newly calculated risk score.

If the counter value is outside the secondary range, the transaction may be denied at 426. If further validation actions are required due to the counter value being outside the acceptable range, the dashed actions depicted in FIG. 4 may be performed.

To this end, an escalated validation request may be transmitted to the client application at 416. The escalated validation request may include requested validation actions to be performed based on the escalated risk tier or the escalated risk actions required by the validation analytics. For instance, escalated validation actions may involve answering security questions, providing biometric authentication, taking a picture of the user's identification, or presenting themselves in person at a defined location.

In this example, the escalated validation request 416 requests that the user take a picture of their identification, such as a driver's license. Accordingly, at 418 the application may request access to the device camera from the client operating system. A picture may be captured, and at 420 the photograph may be transmitted to the client application.

Based on the photograph captured, an escalated validation response may be generated at 422 and transmitted to the transaction validation server.

At 424, the server may perform escalated validation analytics on the escalated validation response. For instance, the server may compare the user's photograph in their identification with a photograph stored at the server, or may compare the user's signature on their identification to a stored signature, or any other suitable action based on the escalated validation response (e.g., comparing biometrics to biometrics stored at the server, or receiving an indication that the client device has confirmed the biometrics, etc.).

Figure 6:
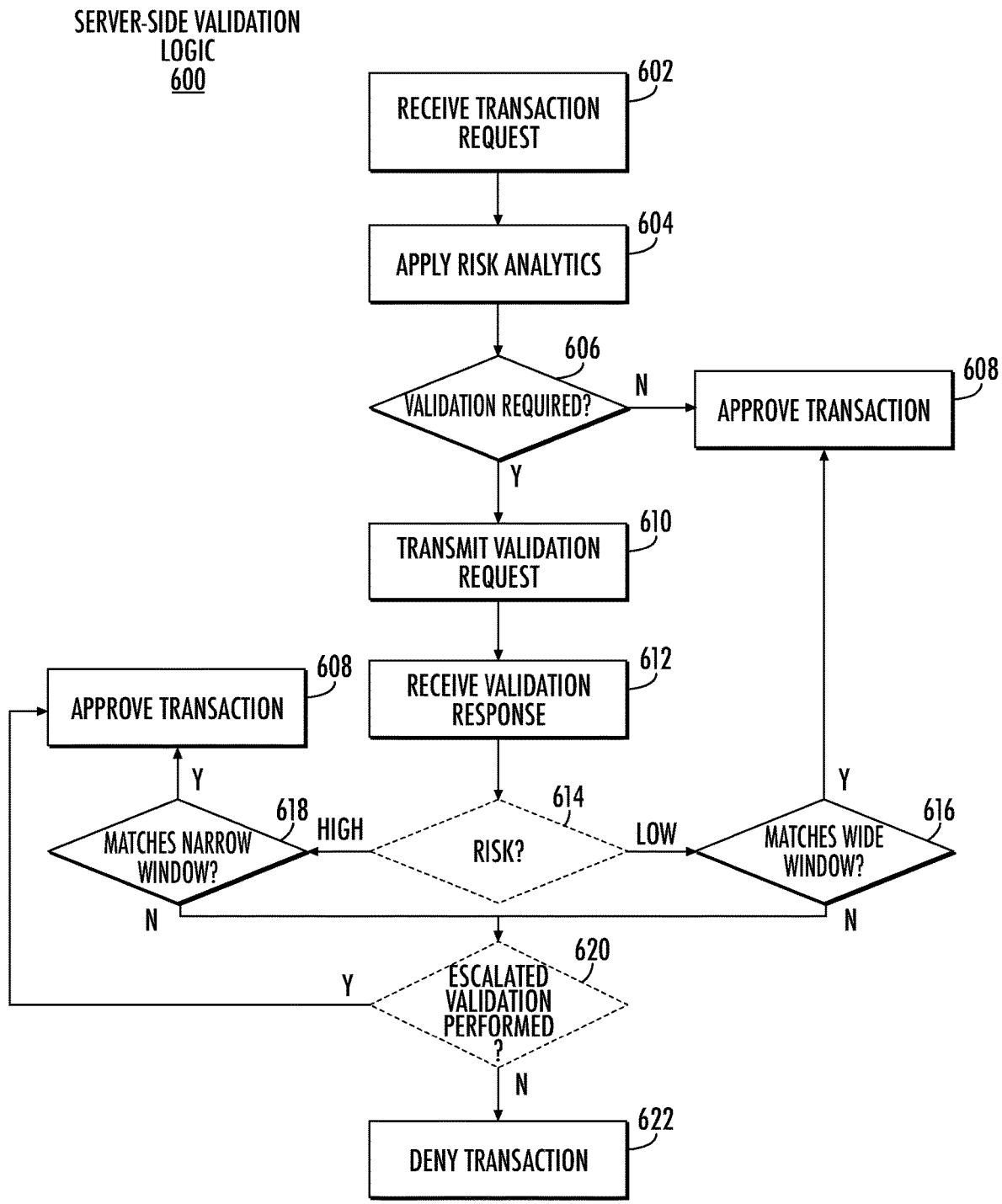
FIG. 6 is a flowchart depicting exemplary server-side transaction validation logic.

Optionally, at 428 the server may update the current risk score based upon information determined during the validation process. For example, if the counter value was such that no additional escalated validation was required, the server may update the risk score to indicate that the risk was decreasing. If, however, additional escalated validation was required, and the additional validation succeeded, then the risk score may be updated to maintain the current risk level. If the authentication failed, the risk level may be updated to indicate a higher level of risk going forward The above-described actions may be performed by client-side validation logic 500 (FIG. 5) in cooperation with server-side validation logic 600 (FIG. 6).

The client-side validation logic 500 may include logic for, at block 502, authenticating the user to the client-side service provider application. For example, the logic may involve instructions for validating a user name and password combination, validating biometric login information, etc.

At block 504, a validation request may be received from the transaction validation server. The validation request may specify details of the transaction being validated and/or validation actions required (such as scanning the card's physical token).

Blocks 502 and 504 may be performed in reverse, so that the validation request is received before authenticating to the application.

In response to the validation request, the client application may call on the client device's short-range (e.g., NFC) reader at block 506. At block 508, the reader may be used to exchange or read information (including the counter value cryptographically encoded at the token using one or more security keys) with the physical token.

At block 510, the device may generate a validation response. This may include the cryptographically encoded counter value read from the token at 508. At block 512, the validation response may be transmitted to the transaction validation server.

If the server determines that escalated validation is required, at block 514 the client may receive an escalated validation request and may perform the escalated validation actions specified (e.g., capturing a photograph of the user's identification). The client may respond to the escalated validation request using the information captured in response to the escalated validation actions.

FIG. 6 depicts the corresponding logic 600 performed by the validation server.

At block 502, the validation server may receive a transaction request from a vendor server. The transaction request may specify an identity of the vendor, an amount of the transaction, and any other relevant details that may be used by risk analytics performed at block 604.

Based on the risk analytics, an initial risk score may be calculated, and an associated validation action may be retrieved. In some cases, no validation action may be required. The system may determine whether this is the case at block 606 and, if no validation is required (e.g., due to the risk score being below a predefined low threshold), processing may proceed to block 608 and the transaction may be approved. Accordingly, an approval message may be generated and transmitted to the vendor server.

If validation is required, then at block 610, the server may transmit a validation request to the client device associated with the user account assigned to the transaction (e.g, based on information retrieved from the user database 122 of FIG. 1A). The server may receive a validation response with the requested information from the client at block 612.

The validation response may be processed to, for instance, authenticate the cryptogram in the validation response and retrieve the counter value. The server may identify, at block 614, a risk tier as determined by the risk analytics performed in block 604.

In this example, two risk tiers are defined (high and low). Based on the risk tier, a counter value range may be defined (e.g., a narrow window for the high risk tier, or a wide window for the low risk tier). In some cases, the counter value range may be a predetermined range associated with the risk score. In others, the counter value range may be dynamically determined based on the risk score or risk factors (such as the current risk level of the environment). There may be multiple different risk tiers, each with their own window size.

If the received counter value is within the specified range for the risk tier (a "yes" at block 618 or 616), processing may proceed to block 608 and the transaction may be approved.

If, on the other hand, the counter value is not within the specified range for the risk tier ("no" at block 616 or 618), then processing may proceed to block 620. Optionally, escalated validation may be performed at this block. As part of the escalated validation procedure, an updated risk score may be calculated and the risk score may be matched to a new risk tier. Alternatively, escalated validation actions defined for the current risk tier may be performed.

If the escalated validation is successful, then processing may proceed to block 608 and the transaction may be approved. If the escalated validation is not successful, or if escalated validation is not performed at this stage, processing may proceed to block 622 and the transaction may be denied. Alternatively, if escalated validation is not successful, processing may return to block 620 and a further updated risk score may be calculated. The process may repeat until a predetermined number of maximum iterations have occurred, until the risk score exceeds a predetermined maximum threshold, or until a predefined stopping condition is met.

At any point during this process (e.g, during approval or denial at blocks 608 and/or 622), data from the authentication process may be fed back to the system to be used as part of the risk computation process. Thus, the risk computation may be updated based on the authentication/verification procedure, and vice versa. This may allow the system to generate a feedback loop in which the authentication process influences the risk assessment, and the risk assessment influences the authentication process.

Figure 7:
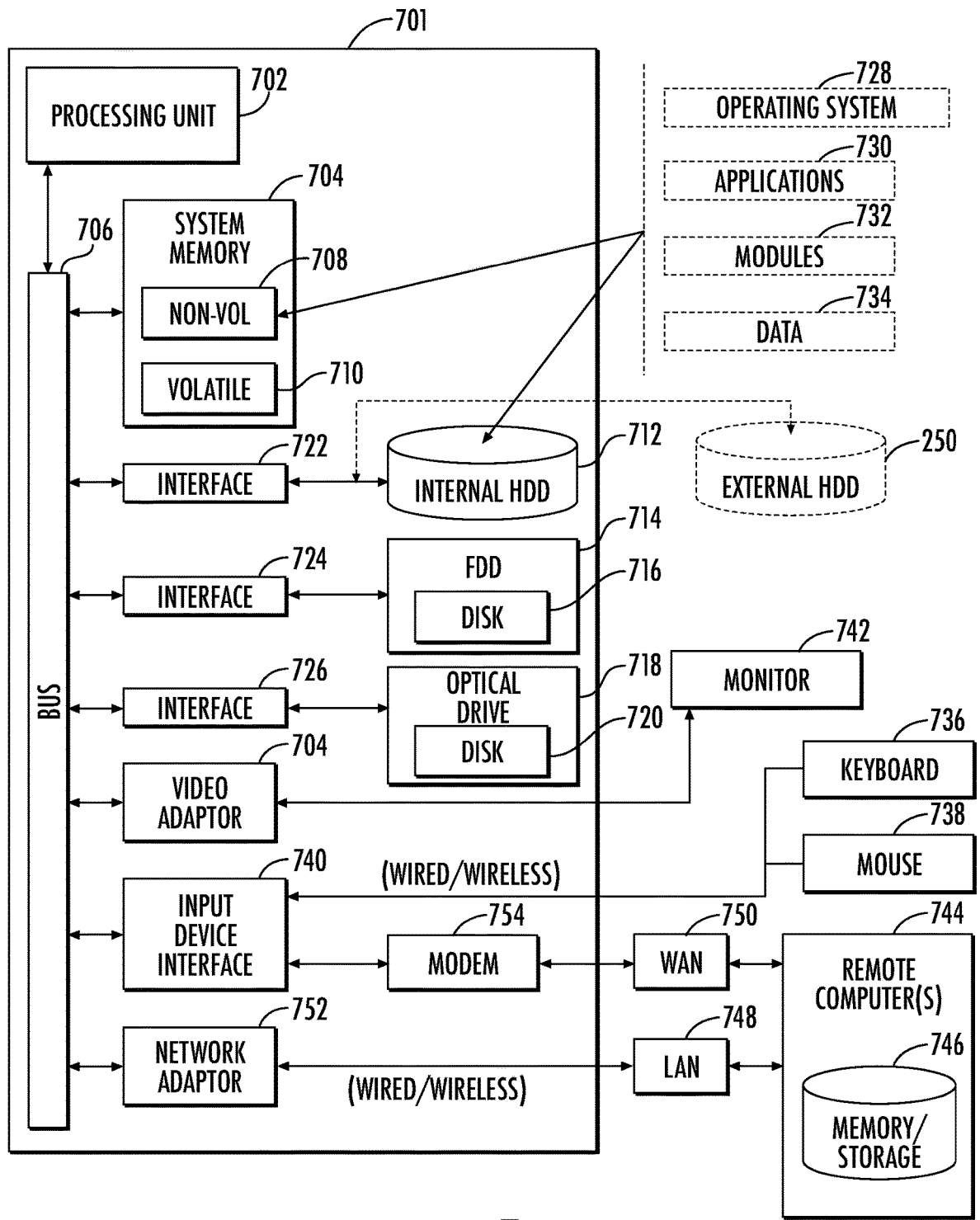
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
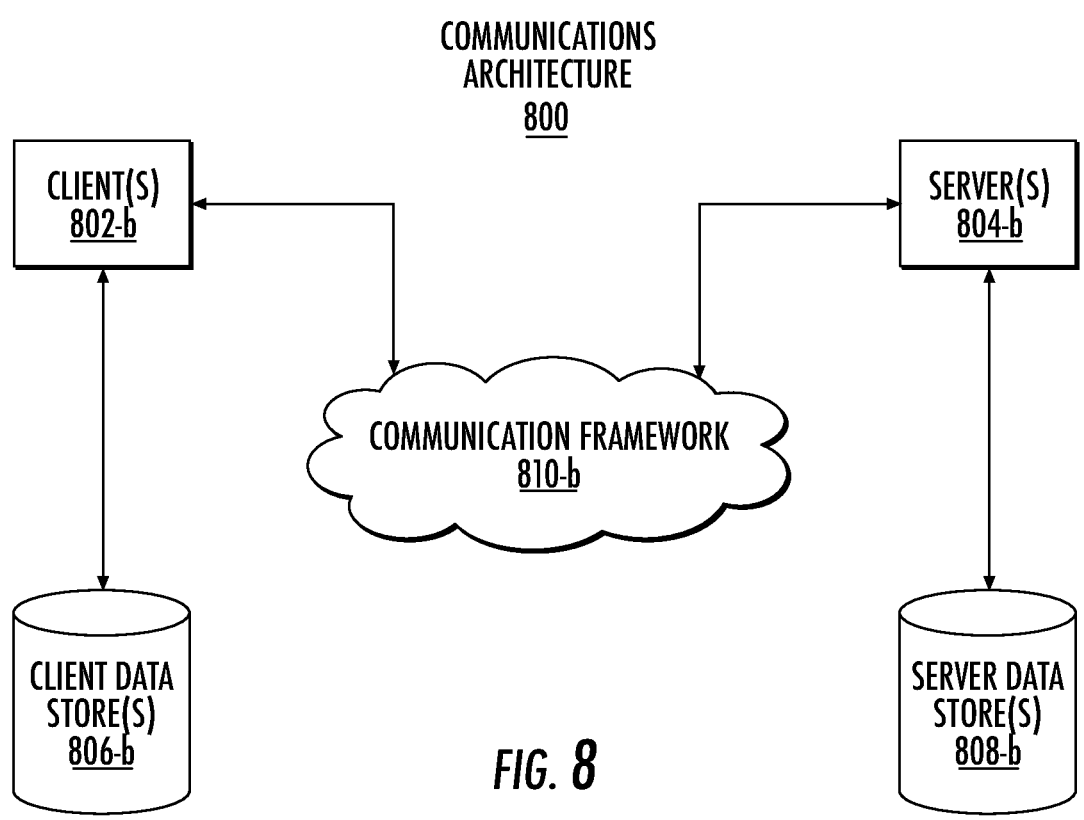
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:

receiving, by a server system, a request from a computer device, the request associated with a transaction and a user account;

identifying, by the server system, a validation action based on a risk analysis performed on information associated with the request;

sending, by the server system, a validation request to a computing device associated with the user account;

receiving, by the server system, a validation response from the computing device based on the validation request, the validation response comprising a cryptogram and a counter value from a contactless card;

identifying, by the server system, a counter value range based on a risk tier associated with the transaction, the counter value range defining an acceptable range of variance between the counter value received from the contactless card and a stored counter value on the server, and the counter value range for a lower risk tier is larger than the counter value range for a higher risk tier;

determining, by the server system, the counter value from the contactless card is within the counter value range for the transaction; and approving, by the server system, occurrence of the transaction.

2. The computer-implemented method of claim 1, wherein the risk analysis is based on an amount of the transaction, a location of the transaction, a purchase history of the user, or a combination thereof.

3. The computer-implemented method of claim 1, wherein the risk analysis is based on an overall risk environment including one or more factors.

4. The computer-implemented method of claim 3, wherein the one or more factors comprise whether an issuing back is under a fraud attack, whether other banks have reported a recent increase in fraud), whether the transaction is typical of the user's activity based on price, location, or both.

5. The computer-implemented method of claim 1, comprising:

decrypting at least a portion of the validation response prior to determining the counter value is within the counter value range; and validating the contactless card based on the token identifier in the validation response matching a stored token identifier.

6. The computer-implemented method of claim 5, comprising:

retrieving a user record corresponding to a user account, the user record comprising the stored token identifier and the stored counter value; and comparing the counter value to the stored counter value to determine the counter value is within the counter value range;

wherein the counter value range is determined dynamically based on historical data associated with the user account.

7. The computer-implemented method of claim 1, wherein the cryptogram is generated by the contactless card utilizing a session key.

8. A non-transitory computer-readable storage medium, the computer-readable storage medium including instructions that when executed by a computer, cause the computer to:

receive a request from a computer device, the request associated with a transaction and a user account;

identify a validation action based on a risk analysis performed on information associated with the request;

send a validation request to a computing device associated with the user account;

receive a validation response from the computing device based on the validation request, the validation response comprising a cryptogram and a counter value from a contactless card;

identify a counter value range based on a risk tier associated with the transaction, the counter value range defining an acceptable range of variance between the counter value received from the contactless card and a stored counter value on the computer, and the counter value range for a lower risk tier is larger than the counter value range for a higher risk tier;

determine the counter value from the contactless card is within the counter value range for the transaction; and approve occurrence of the transaction.

9. The computer-readable storage medium of claim 8, wherein the risk analysis is based on an amount of the transaction, a location of the transaction, a purchase history of the user, or a combination thereof.

10. The computer-readable storage medium of claim 8, wherein the risk analysis is based on an overall risk environment including one or more factors.

11. The computer-readable storage medium of claim 10, wherein the one or more factors comprise whether an issuing back is under a fraud attack, whether other banks have reported a recent increase in fraud), whether the transaction is typical of the user's activity based on price, location, or both.

12. The computer-readable storage medium of claim 8, comprising the computer to:

decrypt at least a portion of the validation response prior to determining the counter value is within the counter value range; and validate the contactless card based on the token identifier in the validation response matching a stored token identifier.

13. The computer-readable storage medium of claim 12, comprising the computer to:

retrieve a user record corresponding to a user account, the user record comprising the stored token identifier and the stored counter value; and compare the counter value to the stored counter value to determine the counter value is within the counter value range; and wherein the counter value range is determined dynamically based on historical data associated with the user account.

14. The computer-readable storage medium of claim 8, wherein the cryptogram is generated by the contactless card utilize a session key.

15. A computing apparatus comprising:

a processor; and a memory storing instructions that, when executed by the processor, configure the processor to:

receive a request from a computer device, the request associated with a transaction and a user account;

identify, by the server system, a validation action based on a risk analysis performed on information associated with the request;

send a validation request to a computing device associated with the user account;

receive a validation response from the computing device based on the validation request, the validation response comprising a cryptogram and a counter value from a contactless card;

identify a counter value range based on a risk tier associated with the transaction, the counter value range defining an acceptable range of variance between the counter value received from the contactless card and a stored counter value on the server, and the counter value range for a lower risk tier is larger than the counter value range for a higher risk tier;

determine whether the counter value from the contactless card is within the counter value range for the transaction;

in response to the counter value from the contactless card not being in range, deny the transaction; and in response to the counter value from the contactless card being in range, approve occurrence of the transaction.

16. The computing apparatus of claim 15, wherein the risk analysis is based on an amount of the transaction, a location of the transaction, a purchase history of the user, or a combination thereof.

17. The computing apparatus of claim 15, wherein the risk analysis is based on an overall risk environment include one or more factors.

18. The computing apparatus of claim 17, wherein the one or more factors comprise whether an issuing back is under a fraud attack, whether other banks have reported a recent increase in fraud), whether the transaction is typical of the user's activity based on price, location, or both.

19. The computing apparatus of claim 15, comprising the processor:
- decrypt at least a portion of the validation response prior to determining the counter value is within the counter value range; and
- validate the contactless card based on the token identifier in the validation response matching a stored token identifier.

20. The computing apparatus of claim 19, comprising the processor to:
- retrieve a user record corresponding to a user account, the user record comprising the stored token identifier and a stored counter value; and
- compare the counter value to the stored counter value to determine the counter value is within the counter value range; and
- wherein the counter value range is determined dynamically based on historical data associated with the user account.

\* \* \* \* \*